(12) United States Patent
Tsutsui

(10) Patent No.: US 8,121,019 B2
(45) Date of Patent: Feb. 21, 2012

(54) WIRELESS COMMUNICATION APPARATUS, MOBILE TERMINAL, AND WIRELESS COMMUNICATION METHOD

(75) Inventor: Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1112 days.

(21) Appl. No.: 11/979,591

(22) Filed: Nov. 6, 2007

(65) Prior Publication Data
US 2008/0089269 A1    Apr. 17, 2008

Related U.S. Application Data

(63) Continuation of application No. PCT/JP2005/009241, filed on May 20, 2005.

(51) Int. Cl.
*H04J 9/00* (2006.01)

(52) U.S. Cl. ........ 370/204; 370/328; 370/334; 370/338; 370/465; 455/561; 455/562.1; 455/101; 375/267

(58) Field of Classification Search ............... 455/452.2, 455/63.4, 575.7, 561, 562.1, 101; 370/203–211, 370/328–339, 465; 375/267, 347
See application file for complete search history.

(56) References Cited

U.S. PATENT DOCUMENTS

| | | | |
|---|---|---|---|
| 6,477,353 B1 * | 11/2002 | Honda et al. | 455/11.1 |
| 6,771,985 B1 * | 8/2004 | Iinuma | 455/561 |
| 6,836,674 B2 * | 12/2004 | Taniguchi et al. | 455/562.1 |
| 7,133,698 B2 * | 11/2006 | Miyoshi et al. | 455/562.1 |
| 7,778,147 B2 * | 8/2010 | Forenza et al. | 370/204 |
| 2004/0203786 A1 * | 10/2004 | Ishiguro et al. | 455/436 |

FOREIGN PATENT DOCUMENTS

| | | |
|---|---|---|
| EP | 1 187 506 A1 | 3/2002 |
| EP | 1 487 135 A1 | 12/2004 |
| JP | 2004-072624 | 3/2004 |
| JP | 2004-194262 | 7/2004 |
| WO | WO 02/099995 A2 | 12/2002 |
| WO | WO 03/071714 | 8/2003 |

* cited by examiner

*Primary Examiner* — Christopher Grey
(74) *Attorney, Agent, or Firm* — Myers Wolin, LLC

(57) ABSTRACT

In a communication system in which communication is performed by switching between first multi-antenna transmission control which performs multi-stream transmission and second multi-antenna transmission control which performs single-stream transmission, the distance between a base station and a mobile terminal is calculated, and if the distance to the terminal is smaller than a preset distance, multiple-input multiple-output (MIMO) transmission control is performed as the first multi-antenna transmission control, but if the distance to the terminal is greater than the preset distance, adaptive array antenna (AAA) control is performed as the second multi-antenna transmission control.

2 Claims, 15 Drawing Sheets

WIRELESS COMMUNICATION APPARATUS, MOBILE TERMINAL, AND WIRELESS COMMUNICATION METHOD

CROSS-REFERENCE TO RELATED APPLICATIONS

This is a continuation application of International Application Number PCT/JP2005/009241, which was filed on May 20, 2005.

BACKGROUND OF THE INVENTION

The present invention relates to a wireless communication apparatus, a mobile terminal, and a wireless communication method, and in particular relates to a wireless communication apparatus, mobile terminal, and wireless communication method, in which a plurality of antennas are provided and in which switching is performed between first multi-antenna transmission control that performs multi-stream transmission (for example, MIMO transmission control) and second multi-antenna transmission control that performs single-stream transmission (for example, AAA transmission control).

In multi-antenna technology using multiple antennas, there are both MIMO (multiple-input, multiple-output) transmission control to transmit multiple streams, and AAA (adaptive array antenna) transmission control to transmit a single stream.

MIMO

FIG. 18 shows the configuration of a MIMO multiplexed transmission system, where TRX is a transmitting station and REC is a receiving station. The same number of data streams $D_0$ to $D_{M-1}$ as the number of transmission antennas M pass through data modulation unit, D/A conversion unit, quadrature modulation unit, frequency up-conversion unit, and similar in the respective transmission apparatus (TRX$_0$ to TRX$_{M-1}$) $1_0$ to $1_{M-1}$, and are transmitted from each of the antennas $2_0$ to $2_{M-1}$. Signals transmitted from the antennas $2_0$ to $2_{M-1}$, disposed such that there is no mutual correlation, pass through independent fading channels $h_{nm}$ (m=0 to M−1, n=0 to N−1), and after space multiplexing are received by N receiving antennas $3_0$ to $3_{N-1}$. Signals received by each receiving antenna pass through frequency down-conversion unit, quadrature detection unit, A/D conversion unit and similar in the reception apparatus (REC$_0$ to REC$_{N-1}$) $4_0$ to $4_{N-1}$, to generate received data streams $y_0$ to $y_{N-1}$. Each of the received data streams is the result of multiplexing M transmitted data streams, and so in the data processing portion 5 signal processing of all the received data streams is performed, so that the transmitted data streams $D_0$ to $D_{M-1}$ can be separated and reproduced.

Signal processing algorithms to separate the transmitted data streams $D_0$ to $D_{M-1}$ from the received signals include such linear algorithms as ZF (Zero-Forcing) and MMSE, employing the inverse matrix of a channel correlation matrix, and nonlinear algorithms, of which BLAST (Bell Laboratories Layered Space-Time) is representative. In addition, MLD (Maximum Likelihood Decoding) and other methods which do not employ operations on the inverse matrix of a correlation matrix are also known. The MLD algorithm is here explained. If the transmitted data streams are represented by an M-dimensional complex matrix, and the received data streams by an N-dimensional complex matrix, then the following equations obtain.

$$Y = H \cdot D \quad (1)$$

$$H = \begin{bmatrix} h_{00} \cdot h_{01} & \cdots & h_{0M-1} \\ h_{10} & \cdots & h_{1M-1} \\ & \cdots & \\ h_{N-10} & \cdots & h_{N-1M-1} \end{bmatrix}$$

$$D = [D_0 \cdot D_1 \ldots D_{M-1}]^T$$

$$Y = [y_0 \cdot y_1 \ldots y_{N-1}]^T$$

The MLD algorithm is a method which does not employ operations on the inverse matrix of the correlation matrix; the transmitted data streams (transmission vector) D are inferred from the following equation.

$$\hat{D} = \arg\min \|Y - H \cdot D\|^2 \quad (2)$$

Here, if the number of signal points of modulated data input to each of the M antennas is Q, then there exist $Q^M$ combinations of transmission vectors D. In QPSK, Q=4, in 16QAM, Q=16, and in 64QAM, Q=64. The MLD algorithm is a method in which $Q^M$ transmission vector candidates (replicas) are generated, computations using the above equations are performed, and the replica for which the result is smallest is inferred to be the input data.

AAA

An array antenna comprises a plurality of antenna elements, arranged in different spatial positions in a straight line. Technology in which the signals input to each of the antenna elements in this array antenna are weighted, to direct a transmission beam toward a mobile terminal, is called AAA (Adaptive Array Antenna) control.

FIG. 19 shows the configuration of a wireless apparatus which uses AAA control for data transmission and reception. The array antenna 30 receives signals, which are input to a baseband and digital signal processing portion 31. The signal processing portion 31 performs signal processing for each antenna element, and outputs complex digital reception data. The arrival direction estimation portion 32 estimates the arrival direction of signals, using the complex digital reception data for each antenna element. The beamformer (reception beamformer) 33 uses the estimated values for the arrival direction of signals, acquired from the arrival direction estimation portion 32, to form a beam having a peak in the signal source direction. That is, the beamformer 33 extracts the desired signals (signals from the mobile terminal), while suppressing interference, noise and similar, and sends the signals to the channel reception portion 34. The channel reception portion 34 uses well-known methods to perform reception processing, and demodulates and outputs the received data.

On the other hand, when transmitting data to the mobile terminal, the transmission beamformer 35, upon input of transmission data from the transmission portion 36, forms a transmission beam pattern such that the peak is directed in the direction estimated by the arrival direction estimation portion 32, and inputs complex digital transmission signals to the baseband and digital signal processing portion 37. The signal processing portion 37 converts the complex digital transmission data into wireless signals, which are input to each of the antenna elements of the array antenna 38. As a result, a beam is radiated toward the receiving station, and the error rate can be reduced. The array antennas 30 and 38 can be made a common antenna.

However, MIMO, AAA, and other multi-antenna technologies have not been introduced into portable telephone systems of current services, and their future application is being studied. There have however been reports of the use of AAA in PHS, and of MIMO in wireless LANs.

These multi-antenna technologies have been studied, and various methods have been proposed, targeting introduction into future mobile communication systems. In MIMO transmission, when as described above there is almost no correlation between signals from the transmission antennas to the reception antennas, high-speed data transmission can be achieved, and AAA transmission is effective when the correlation between signals from the transmitting antennas to the receiving antennas is close to 1. Drawing on these facts, as a first technology of the prior art, a method has been proposed of switching between MIMO transmission when the correlation between antennas is low, and AAA transmission when the correlation is high (see JP2004-194262A). In the first technology of the prior art, spatial correlation values between antennas and the received signal SIR (Signal to Interference Ratio) are measured in the receiving apparatus, and using these spatial correlation values and SIR values, the communication capacity for each transmission method (MIMO, AAA, or similar) is determined, the transmission apparatus is notified of the communication method for which the communication capacity is largest, and the transmission apparatus performs transmission according to this transmission method. However, the first technology of the prior art has the problems of requiring calculation of the spatial correlation values between antennas and SIR values, and of having a complex configuration. Further, switching to the optimum transmission method is not possible until the transmission method with the largest communication capacity has been determined, so that there is the problem of delayed switching.

As the second technology of the prior art, a method has been proposed in which the SIR is measured, and when the SIR is equal to or less than a threshold, switching is performed from MIMO to STC (Space-Time Coding) (see JP2004-072624A). STC is a transmission technology in which encoded substreams are transmitted simultaneously from a plurality of antennas, and combines encoding and transmission diversity. That is, in STC the transmission apparatus performs spatial-time encoding processing of the data stream, to generate a plurality of mutually different data streams, and performs wireless transmission of these data streams simultaneously, at the same frequency, from a plurality of transmission antennas. The reception apparatus uses pilot signals included in the reception signals to perform propagation path estimation corresponding to each pair of transmission and reception antennas, and based on the estimated propagation path characteristics, decodes the reception signals, in which information bits and parity bits are superposed.

In the second technology of the prior art, the reception SIR values of the plurality of reception antennas are calculated in the reception apparatus, the SIR values of all the reception antennas are evaluated and the optimum transmission method determined, and the transmission apparatus is instructed to perform transmission using this transmission method; although the configuration is not as complex as in the first technology of the prior art, there is the problem of delayed switching.

When introducing multi-antenna technology into a mobile communication system, MIMO communication targets improvement of the transmission rate (higher throughput), while AAA transmission targets improvement of communication quality (SNR, Signal-to-Noise Ratio). When the overall transmission power is held constant, in MIMO transmission power is allocated to numerous streams to realize a high transmission rate, whereas in AAA, by forming a single stream into a highly directional beam, radio waves can be transmitted farther, so that long-distance communication is possible. In other words, in MIMO transmission high-speed transmission can be achieved, but the communication distance cannot be lengthened. And in AAA transmission, the communication distance can be lengthened, but the transmission rate is limited.

SUMMARY OF THE INVENTION

Hence an object of this invention is to propose a mobile communication system which combines MIMO transmission with AAA transmission wherein the faster transmission is realized by MIMO transmission and the increase of the cell radius is realized by AAA transmission.

Another object of the invention is to enable fast switching between MIMO transmission and AAA transmission through simple control.

A first invention is a wireless communication apparatus, which performs communication and switches between first multi-antenna transmission control that performs multi-stream transmission and second multi-antenna transmission control that performs single-stream transmission, and which comprises a first transmission portion, which performs multiple-input, multiple-output (MIMO) transmission control as the first multi-antenna transmission control; a second transmission portion, which performs the second multi-antenna transmission control; and a control portion, which executes control so as to perform the MIMO transmission when the distance to the communication partner apparatus is smaller than a preset distance, and so as to perform the second multi-antenna transmission when the distance is greater than the preset distance.

The second multi-antenna transmission control is Adaptive Array Antenna (AAA) transmission control or antenna diversity transmission control, and the second transmission portion is an AAA transmission portion or an antenna diversity transmission control portion.

The above wireless communication apparatus comprises a position information acquisition portion for acquiring position information of the mobile terminal which is the communication partner apparatus from this mobile terminal, and the control portion calculates the distance to the terminal using the position information.

The above wireless communication apparatus comprises a position information acquisition portion for acquiring position information related to the mobile terminal which is the communication partner apparatus from the mobile terminal, and a terminal direction calculation portion, which calculates the direction of the terminal from the terminal position information, and the AAA transmission portion has a beamformer which performs beam forming control to direct a beam in the direction of the terminal.

The above wireless communication apparatus comprises a storage portion for storing map information having building data which specifies building positions and the three-dimensional shapes of the buildings; the control portion make reference to the building data and judges whether a building, which blocks communication with the communication partner apparatus, exists on the straight line connecting the wireless communication apparatus to the communication partner apparatus, and if such a building exists, executes control such that MIMO transmission is performed even when the distance to the communication partner apparatus is greater than the preset distance.

The wireless communication apparatus comprises a position information acquisition portion for acquiring position information of the mobile terminals which are the communication partner apparatus from these mobile terminals, and if the angular difference between directions of two terminals which are calculated using position information of these terminals is greater than a preset angle, the AAA transmission portion performs AAA transmission to each terminal simultaneously, but if the angular difference is smaller, executes control so as to perform AAA transmission at different timing.

A second invention is a mobile terminal apparatus, which comprises a plurality of antennas, and which switches between first multi-antenna reception control that performs multi-stream reception and second multi-antenna reception control that performs single-stream reception, and the mobile terminal apparatus further comprises a position measurement portion, which measures the position of the mobile terminal; a position transmission portion, which transmits the position information to a base station; a first multi-antenna reception portion, which performs MIMO reception control as the first multi-antenna reception control; a second multi-antenna reception portion, which performs AAA reception control or antenna diversity reception control as the second multi-antenna reception control; and a switching portion, which, based on a transmission method determined by the base station in conformity with a distance between the base station and the mobile terminal, performs switching between the first multi-antenna reception and the second multi-antenna reception.

The position measurement portion comprises a GPS receiver, which receives GPS signals transmitted from GPS satellites, and a position calculation portion, which calculates the position of the mobile terminal from the GPS signals. Or, the position measurement portion comprises a position calculation portion which detects the reception time differences of signals transmitted synchronously from a plurality of base stations, and based on the reception time differences and base station positions, calculates the position of the mobile terminal.

A third invention is a wireless communication method, in a communication system which performs communication by switching between first multi-antenna transmission control that performs multi-stream transmission and second multi-antenna transmission control that performs single-stream transmission, and has a step of calculating the distance between a base station and a mobile terminal, and a step of performing multiple-input, multiple-output (MIMO) transmission control, as the first multi-antenna transmission control, if the distance is smaller than a preset distance, and of performing the second multi-antenna transmission control if the distance is greater than the preset distance. The second multi-antenna transmission control is Adaptive Array Antenna (AAA) transmission control or antenna diversity transmission control.

DESCRIPTION OF THE PREFERRED EMBODIMENTS (A) First Embodiment

Figure 1:
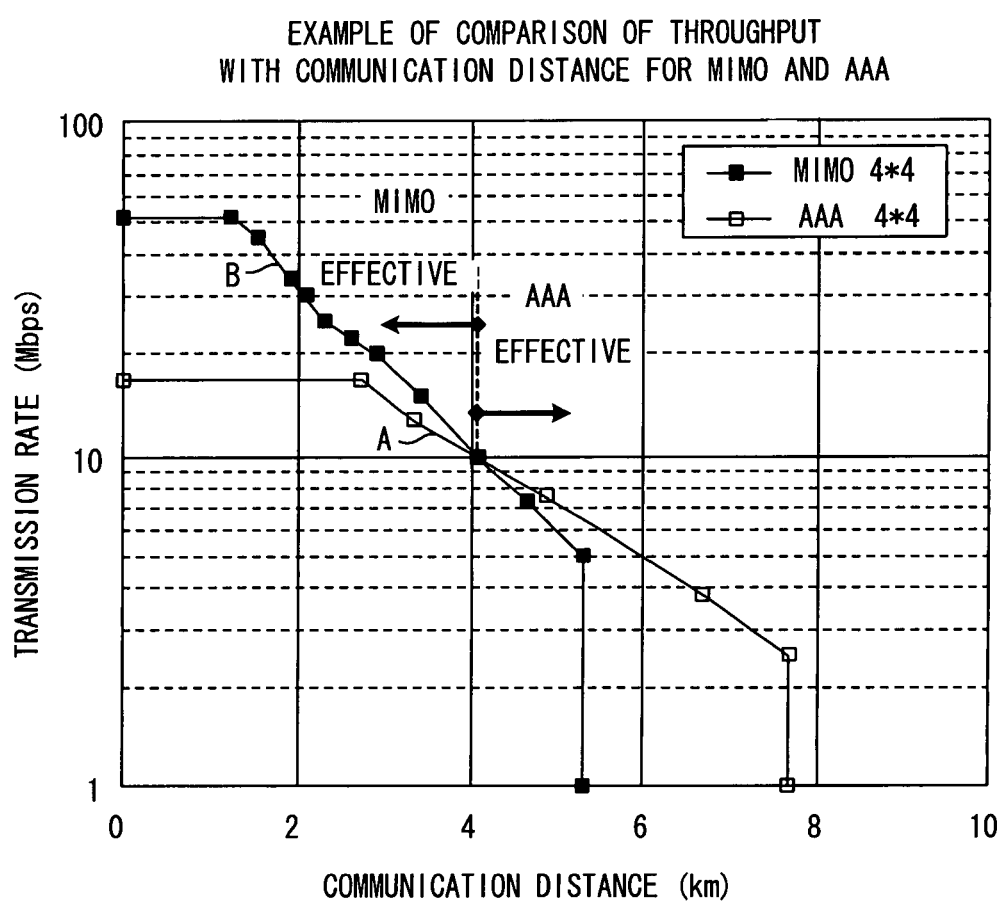
FIG. 1 is an example of comparison of the throughput of MIMO transmission and AAA transmission with communication distance.

FIG. 1 is an example comparing throughput of MIMO transmission and AAA transmission depending on the communication distance, showing the transmission rate when the communication distance is as indicated by the horizontal axis. In the figure, A is the characteristics of AAA transmission, and B is the characteristics of MIMO transmission, for a case in which there are four transmission antennas and four reception antennas. From FIG. 1, for all transmission methods, as the transmission distance increases the transmission loss grows, and the transmission rate declines.

Although MIMO transmission is capable of high-rate transmission over short distances, the transmission rate declines with increasing distance. On the other hand, AAA transmission is capable of only limited transmission rates over short distances, but has the characteristic that the transmission rate does not decline so much as the communication distance is increased. Hence by switching between MIMO transmission and AAA transmission according to the distance between two communication apparatus, that is, performing MIMO transmission over short distances and AAA transmission over long distances, high-rate transmission is possible over short distances, and moreover long-distance communication is also possible. The switching distance is the distance at which the two characteristics A and B intersect (in the example of FIG. 1, 4 km).

Figure 2:
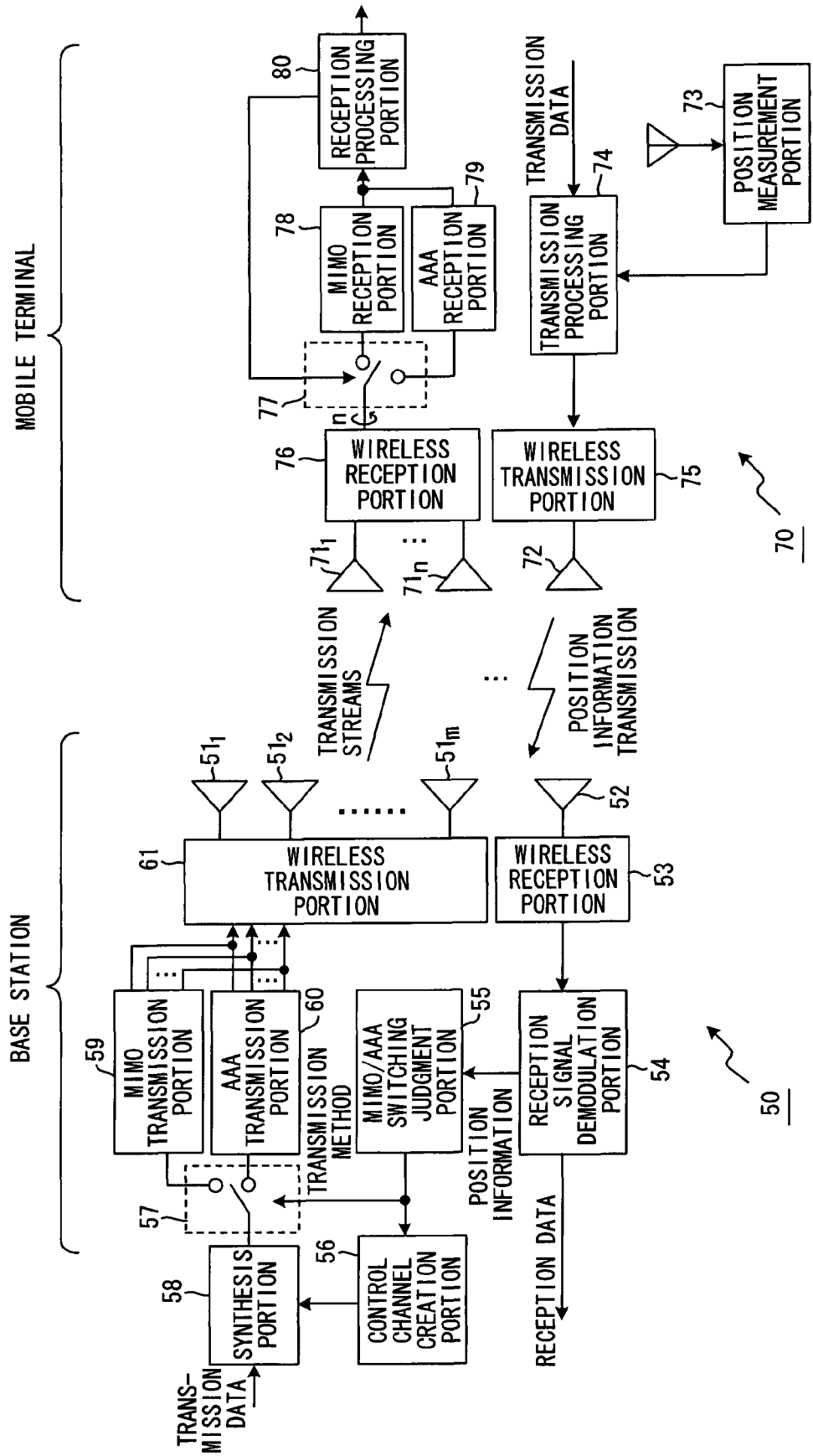
FIG. 2 shows the configuration of the communication system of a first embodiment.

FIG. 2 shows the configuration of the communication system of the first embodiment; a base station apparatus 50 and one mobile station (mobile terminal) 70 are shown. The base station apparatus 50 and mobile terminal 70 each comprise a plurality of antennas, and while multi antenna transmission is performed during downlink communication from the base station 50 to the mobile terminal 70, single antenna transmission/reception is performed during uplink communication from the mobile terminal 70 to the base station 50. That is, the base station 50 comprises a plurality of transmission antennas $51_1$, to $51_m$ and one reception antenna 52, and the mobile terminal 60 comprises a plurality of reception antennas $71_1$ to $71_n$, and one transmission antenna 62. In the base station, one among the transmission antennas $51_1$ to $51_m$ can also serve as the reception antenna, and in the mobile station, one among the reception antennas $71_1$, to $71_n$, can also serve as the transmission antenna.

A position measurement portion 73 is provided in the mobile terminal 70, so that the two-dimensional position (latitude and longitude), or the three-dimensional position, of the mobile terminal 70 can be measured. The transmission processing portion 74 encodes data to be transmitted to the base station, and assembles the data in a prescribed format, for input to the wireless transmission portion 75. The wireless transmission portion 75 converts the baseband transmission data into high-frequency signals, which are transmitted from the transmission antenna 72 toward the base station 50.

The wireless reception portion 53 of the base station 50 frequency down-converts the high-frequency signals received by the reception antenna 52 to baseband signals, and inputs the result to the reception signal demodulation portion 54. The reception signal demodulation portion 54 performs demodulation processing of the reception signals, and inputs mobile terminal position information (latitude and longitude) to the MIMO/AAA switching judgment portion 55. The MIMO/AAA switching judgment portion 55 uses known position information (latitude and longitude) of the base station 50 and the input position information (latitude and longitude) of the mobile terminal to calculate the distance D between the base station and the mobile terminal, and judges whether this distance D is greater than a preset distance Ds (for example, in the example of FIG. 1, 4 km), or is smaller than this distance. If the distance D is smaller than the preset distance Ds, MIMO transmission is to be performed, and if the distance D is larger than the preset distance Ds, AAA transmission is to be performed, and the transmission method is input to the control channel creation portion 56 and to the distribution portion 57.

Figure 3:
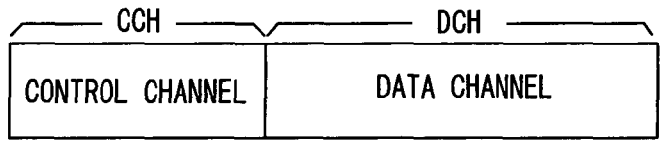
FIG. 3 is a frame format.

The control channel creation portion 56 creates a control channel comprising data indicating the transmission method (whether MIMO or AAA transmission), and the synthesis portion 58 combines the control channel CCH with the data channel DCH, assembles frames having for example the format shown in FIG. 3, and inputs the frames to the distribution portion 57. The distribution portion 57 monitors whether the transmission method has changed, and if the method has changed, inputs a frame comprising the control channel indicating the new transmission method to the transmission portion for the transmission method used up till then, and from the next frame executes distribution control so as to input frames to the transmission portion of the new transmission method.

Figure 4:
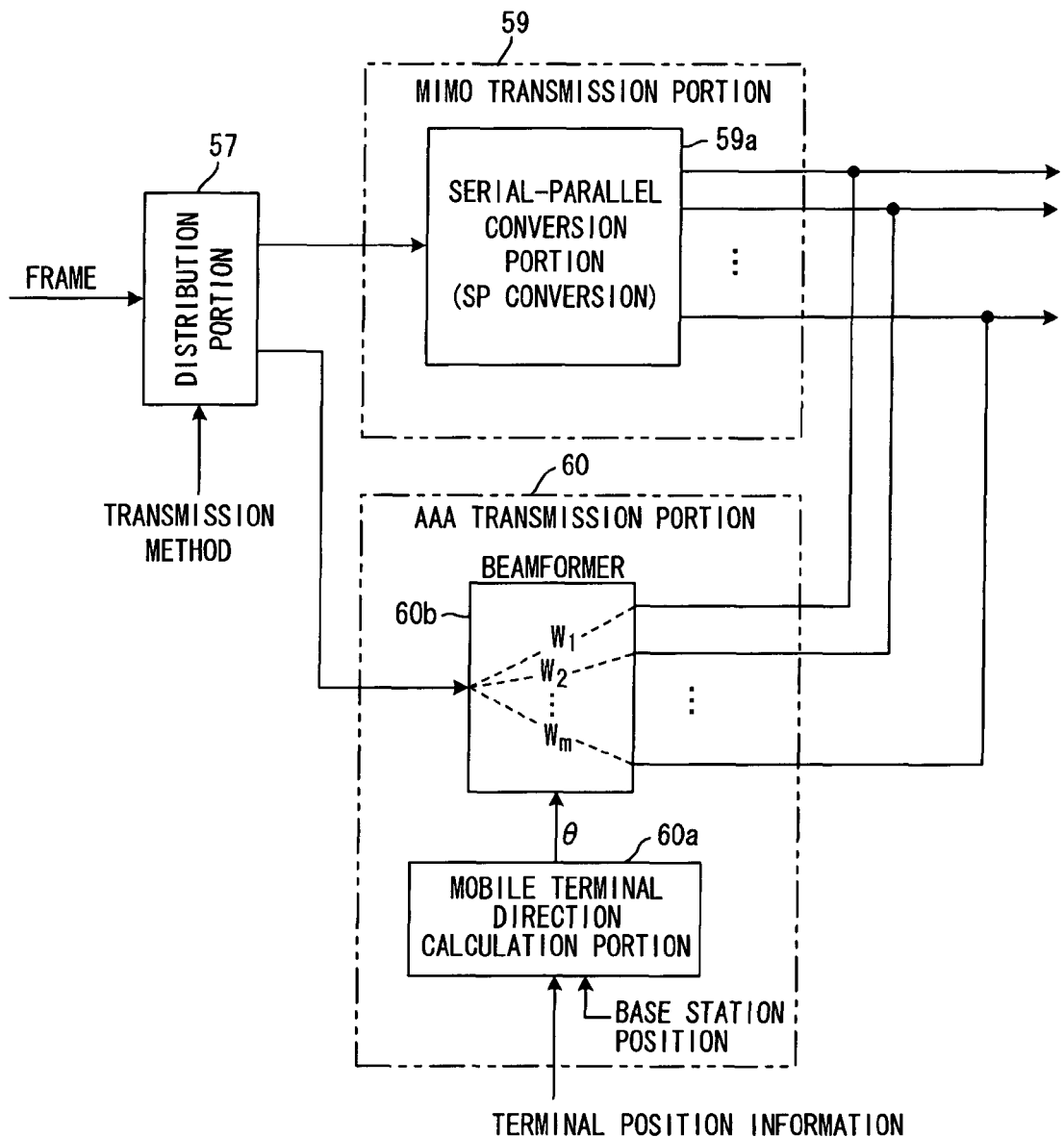
FIG. 4 shows the configuration of a MIMO transmission portion and an AAA transmission portion.

As shown in FIG. 4, the MIMO transmission portion 59 comprises a serial-parallel conversion portion (SP conversion portion) 59a, which converts serial data into m elements of parallel data, which are sent for input to the m transmission antennas $51_1$ to $51_m$. That is, in MIMO transmission the transmission data is converted into m data streams and transmitted.

The mobile terminal direction calculation portion 60a of the AAA transmission portion 60 calculates the mobile terminal direction θ from position information for the mobile terminal 70 and position information for the base station 50, and the beamformer 60b branches the input data into m portions, applies to the branched and input data prescribed weightings (w1 to Wm) such that the beam is directed in the direction of the mobile terminal, and outputs the results to be input to the m transmission antennas. That is, AAA transmission differs from MIMO transmission in that the transmission data is transmitted in a single stream. Here θ is the direction of the mobile terminal in a two-dimensional plane; the beamformer 60b performs two-dimensional beam forming so as to direct the beam in this direction, but it is also possible to determine the three-dimensional direction of the mobile terminal, and have the beamformer 60b perform three-dimensional beam forming so as to direct the beam in the desired direction.

Returning to FIG. 2, the wireless transmission portion 61 converts the m data series input from the MIMO transmission portion 59 or from the AAA transmission portion 60 into high-frequency signals, and then performs amplification and transmits the signals from the transmission antennas $51_1$, to $51_m$ toward the mobile terminal 70.

Signals transmitted from the transmission antennas $51_1$, to $51_m$ are received by the reception antennas $71_1$ to $71_n$ of the mobile terminal, and the wireless reception portion 76 frequency down-converts the signals received by each reception antenna to baseband signals, which are input to the distribution portion 77 in parallel. The distribution portion 77 supplies n number of the baseband signals to the MIMO reception portion 78 or to the AAA reception portion 79, corresponding to the transmission method indicated by the base station 50. The MIMO reception portion 78 performs MIMO reception processing, and inputs demodulated data to the reception processing portion 80; the AAA reception portion 79 performs AAA reception control, and inputs demodulated data to the reception processing portion 80. The reception processing portion 80 subjects the input demodulated data to error correction decoding and outputs the result, and also extracts transmission method information included in the control channel and inputs this information to the distribution portion 77. The distribution portion 77 supplies n number of baseband signals to the MIMO reception portion 78 or to the AAA reception portion 79 indicated by the input transmission method information.

Figure 5:
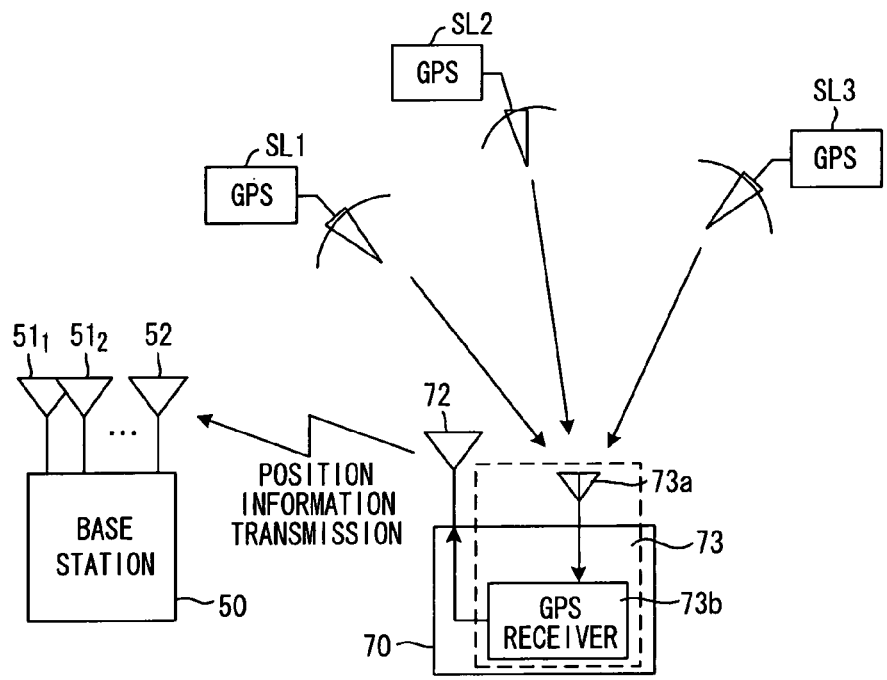
FIG. 5 explains the principle for measurement of positions by the GPS position measurement method.

FIG. 5 explains the principle of measurement of position using a GPS (Global Positioning System) position measurement method. The GPS antenna 73a of the position measurement portion 73 receives GPS radio waves from GPS satellites SL1 to SL3, and the GPS receiver 73b determines the positions (xi, yi, zi) (i=1 to 3) of each of the GPS satellites SL1 to SL3, as well as the radio wave propagation times τi from each satellite, using the received radio waves. Then, the GPS receiver 73b uses the radio wave propagation times τi and the speed c of light to calculate the distances ri (=c·τi) to each GPS satellite, and from these distances ri and the positions of the satellites (xi, yi, zi) (i=1 to 3), calculates the position ($x_0$, $y_0$, $z_0$) of the mobile terminal. That is, for each satellite the equation $$ri = \{(xi-x_0)^2 + (yi-y_0)^2 + (zi-z_0)^2\}^{1/2}$$

is obtained, and so from the above equations the position ($x_0$, $y_0$, $z_0$) of the mobile terminal is calculated.

Figure 6:
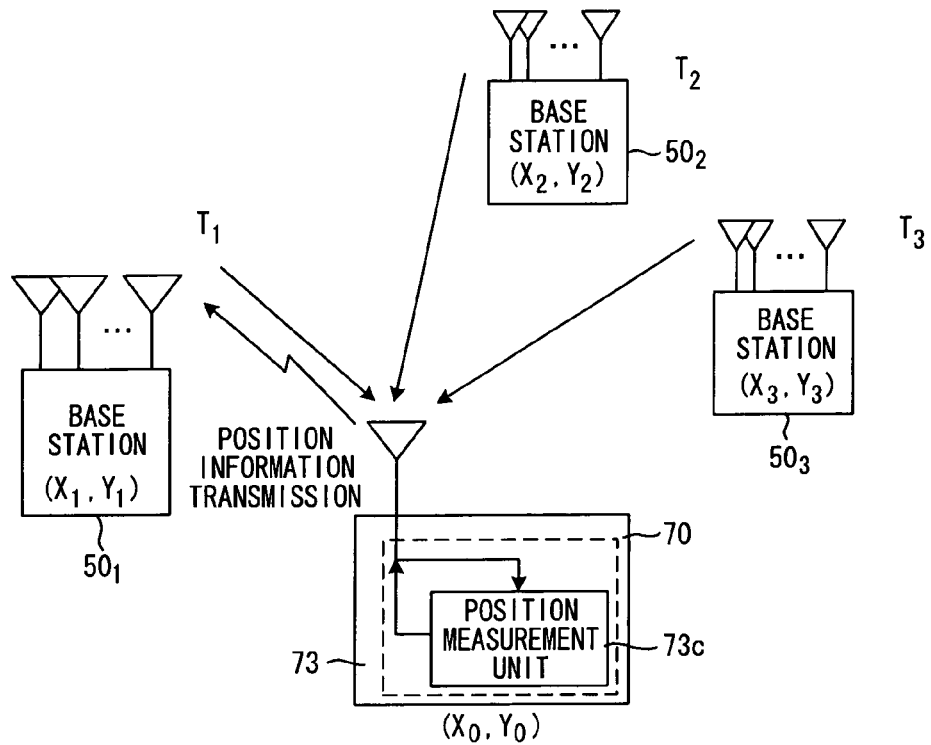
FIG. 6 explains the principle for measurement of positions by the triangulation method.

FIG. 6 explains the principle of position measurement by the triangulation method; radio waves emitted simultaneously from three base stations $50_1$, $50_2$, $50_3$, the positions of which are known, are received by the position measurement unit 73c, arrival time differences T1−T2 and T1−T3 are measured, and from the arrival time differences and the positions of the base stations (Xi, Yi) (i=1 to 3), the position of the mobile terminal $(X_0, Y_0)$ is measured. That is, if C is the radio wave propagation velocity, then the equations $$C(T1-T2) = \{(X_1-X_0)^2+(Y_1-Y_0)^2\}^{1/2} - \{(X_2-X_0)^2+(Y_2-Y_0)^2\}^{1/2}$$

$$C(T1-T3) = \{(X_1-X_0)^2+(Y_1-Y_0)^2\}^{1/2} - \{(X_3-X_0)^2+(Y_2-Y_0)^2\}^{1/2}$$

Are obtained, and from the above equations, the position $(X_0, Y_0)$ of the mobile terminal is calculated.

Figure 7:
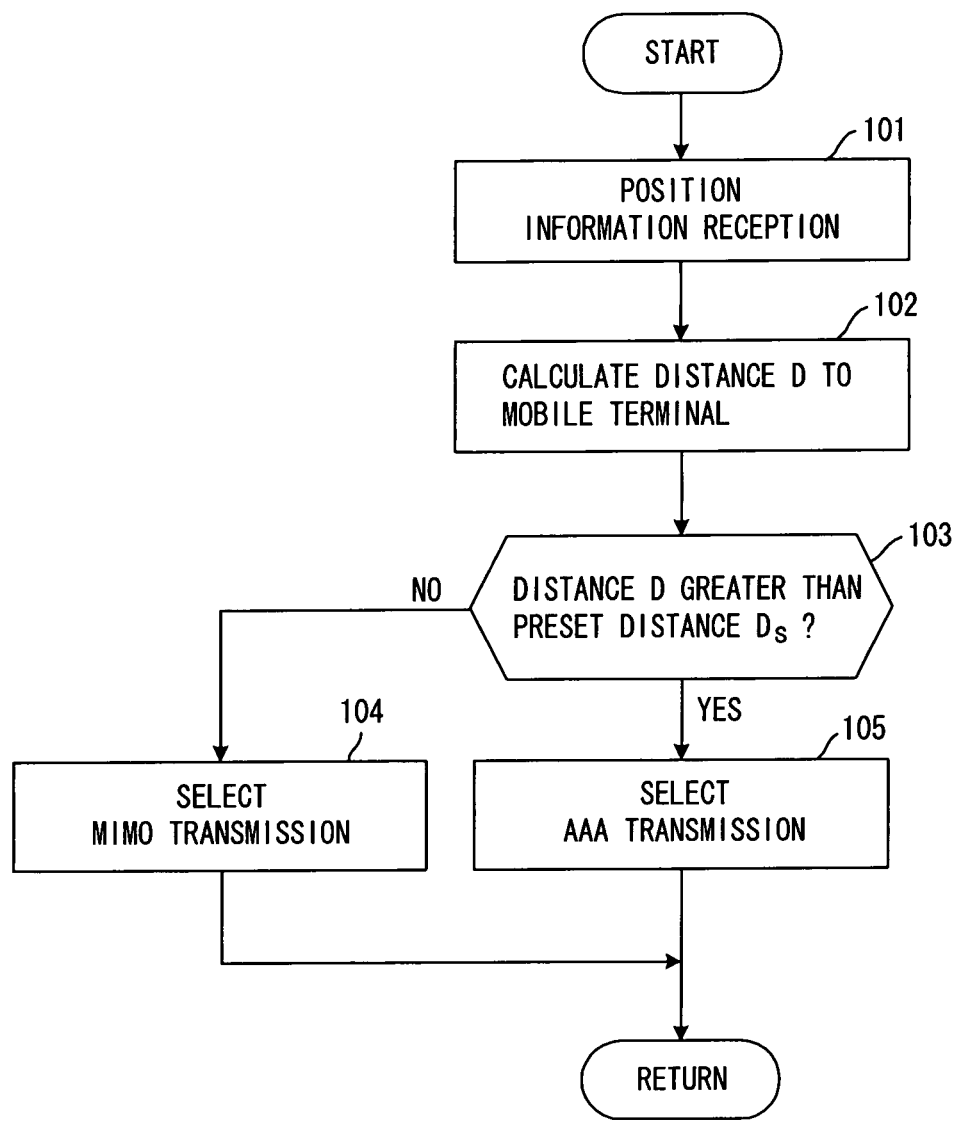
FIG. 7 shows the flow of transmission method determination processing.

FIG. 7 shows the flow of transmission method determination processing. Upon receiving mobile terminal position information (step 101), the MIMO/AAA switching judgment portion 55 uses the mobile terminal position information and the known position information of the base station 50 to calculate the distance D from the base station to the mobile terminal (step 102), compares this distance with a preset distance Ds (step 103), and if D<Ds, executes control to perform MIMO transmission (step 104), but if D≧Ds, executes control to perform AAA transmission (step 105).

Figure 8:
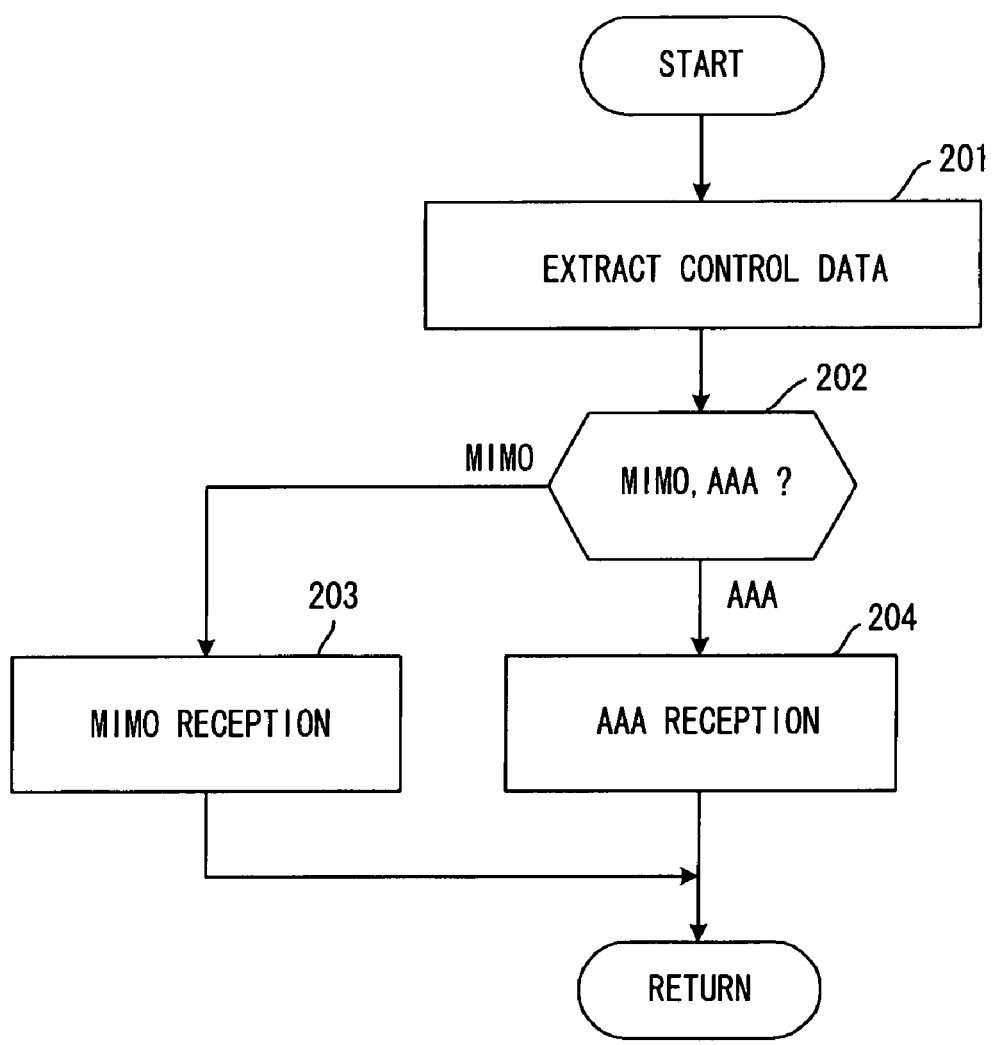
FIG. 8 shows the flow of reception method determination processing.

FIG. 8 shows the flow of reception method determination processing. The reception processing portion 80 extracts control data (step 201), and judges whether the transmission method specification data indicates MIMO transmission or AAA transmission (step 202). If MIMO transmission is indicated, the distribution portion 77 inputs the received data to the MIMO reception portion 78, and the MIMO reception portion 78 performs MIMO reception control and inputs demodulated data to the reception processing portion 80 (step 203). If on the other hand AAA transmission is indicated, the distribution portion 77 inputs the received data to the AAA reception portion 79, and the AAA reception portion 79 performs AAA reception control and inputs the demodulated data to the reception processing portion 80 (step 204), after which the above processing is repeated.

(B) Second Embodiment

In the first embodiment, whether to perform MIMO transmission or AAA transmission was determined based on the magnitude of the distance; in the second embodiment, conditions for determining the transmission method are incorporated according to whether there exists a building or similar which blocks radio waves between the base station and the mobile terminal, or in other words, whether the mobile terminal can be "seen" from the base station.

Figure 9:
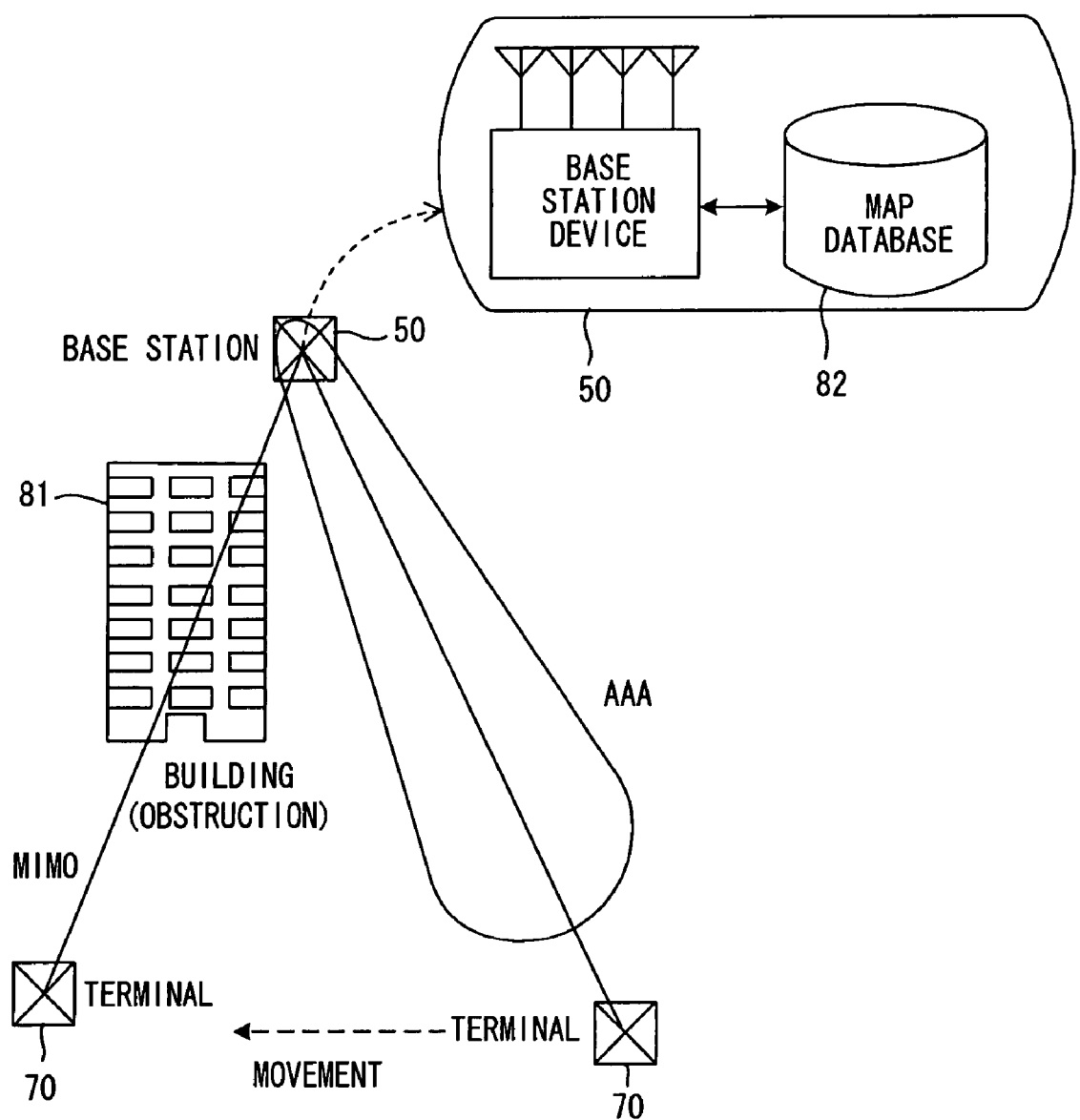
FIG. 9 explains a second embodiment.

FIG. 9 explains the second embodiment. When, although the distance between the base station 50 and the mobile terminal 70 is equal to or greater than the preset distance, there exists a building 81 therebetween which blocks radio waves, even if a beam is formed in the base station so as to be directed toward the mobile terminal 70, the beam is blocked by the building, and so beamforming is pointless. Hence in the second embodiment, control is executed such that the base station 50 performs AAA transmission if the distance to the mobile terminal 70 is equal to or greater than the preset distance and moreover there exist no buildings therebetween which block radio waves; but when the distance between the base station 50 and the mobile terminal 70 is equal to or greater than the preset distance, but due to movement of the mobile terminal 70 there exists a building 81 therebetween which blocks radio waves, control is executed such that MIMO transmission is performed. The judgment as to whether there exists a building 81 which blocks radio waves is performed using a map database used in automobile navigation apparatus, or using a building map database which specifies the positions and three-dimensional shapes of buildings (road information is unnecessary).

Figure 10:
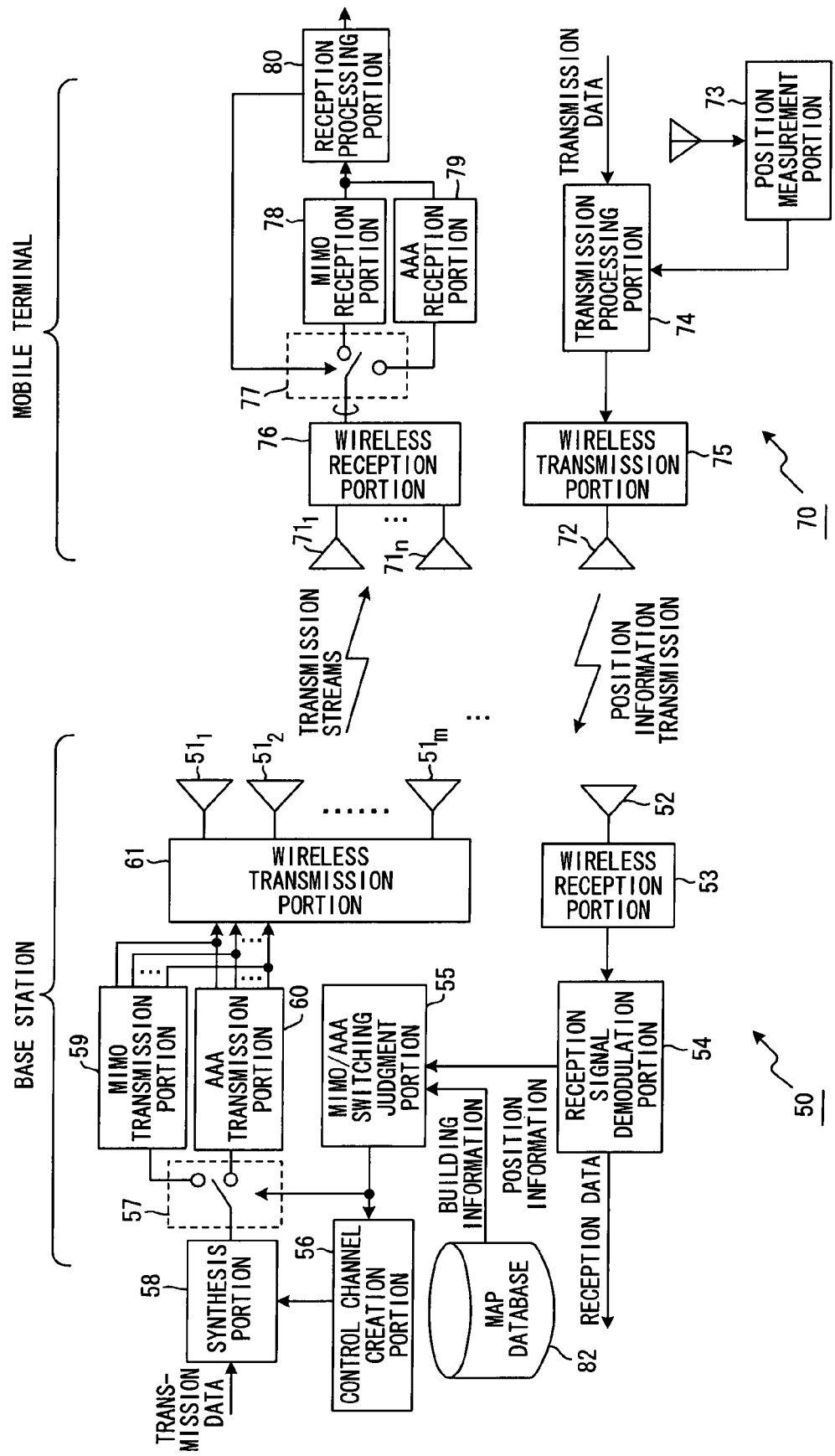
FIG. 10 shows the configuration of the communication system of the second embodiment.

FIG. 10 shows the configuration of the communication system of the second embodiment; portions which are the same as in the first embodiment in FIG. 2 are assigned the same symbols. Differences include the fact that a map database 82 is provided, and that the MIMO/AAA switching judgment portion 55 includes, as a condition for transmission method determination, whether the mobile terminal can be "seen" from the base station.

Figure 11:
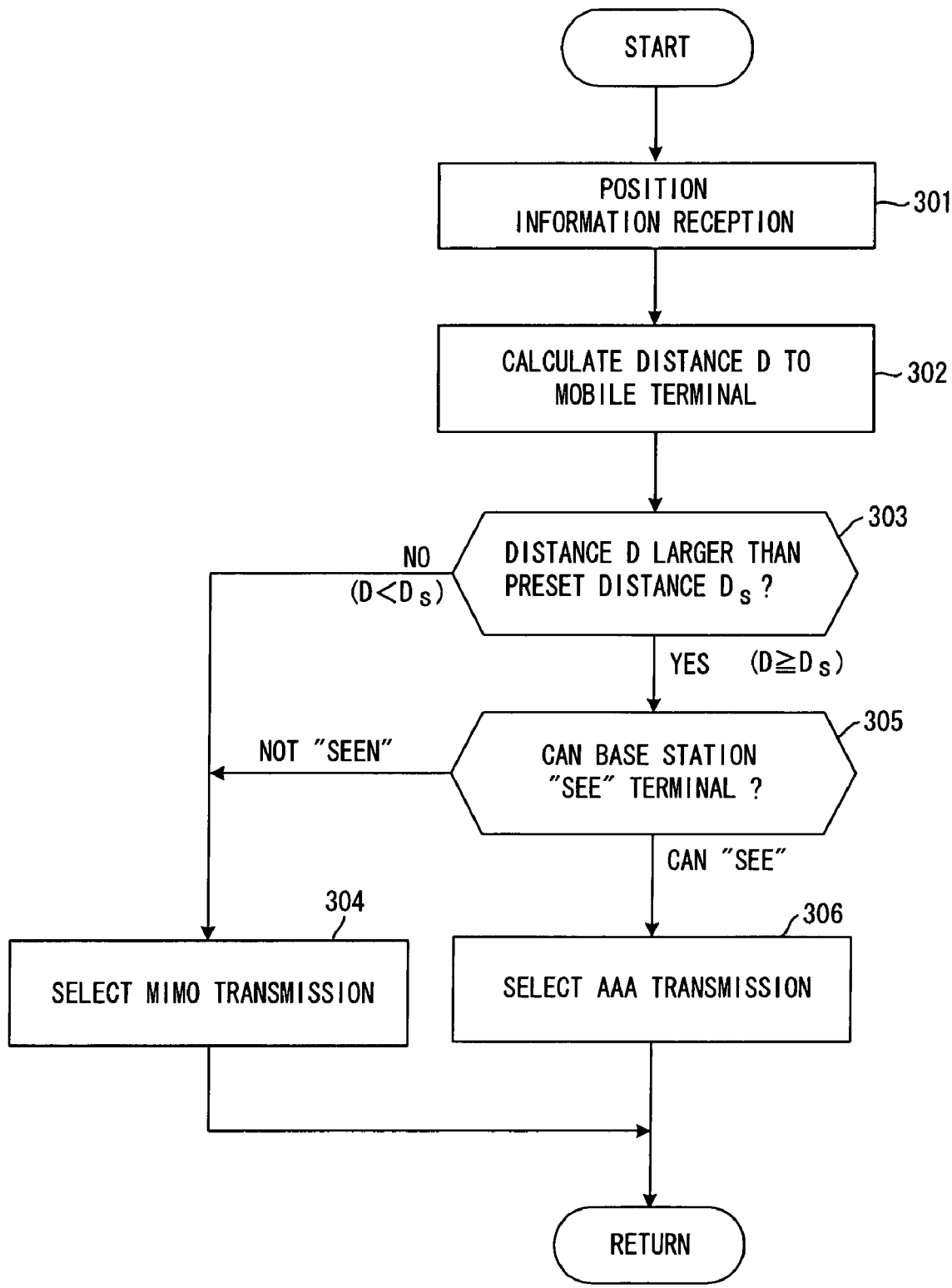
FIG. 11 shows the flow of transmission method determination processing in the second embodiment.

FIG. 11 shows the flow of transmission method determination processing in the second embodiment. The MIMO/AAA switching judgment portion 55, upon receiving mobile terminal position information (step 301), uses the mobile terminal position information and position information for the base station 50 to calculate the distance D from the base station to the mobile terminal (step 302), compares this distance with the preset distance Ds (step 303), and if D<Ds, executes control so as to perform MIMO transmission (step 304), but if D≧Ds, makes reference to the building information and judges whether the mobile terminal can be "seen" from the base station (step 305), and if the mobile terminal cannot be "seen", executes control to perform MIMO transmission (step 304), but if the mobile terminal can be "seen", executes control to perform AAA transmission (step 306).

(C) Third Embodiment

Figure 12:
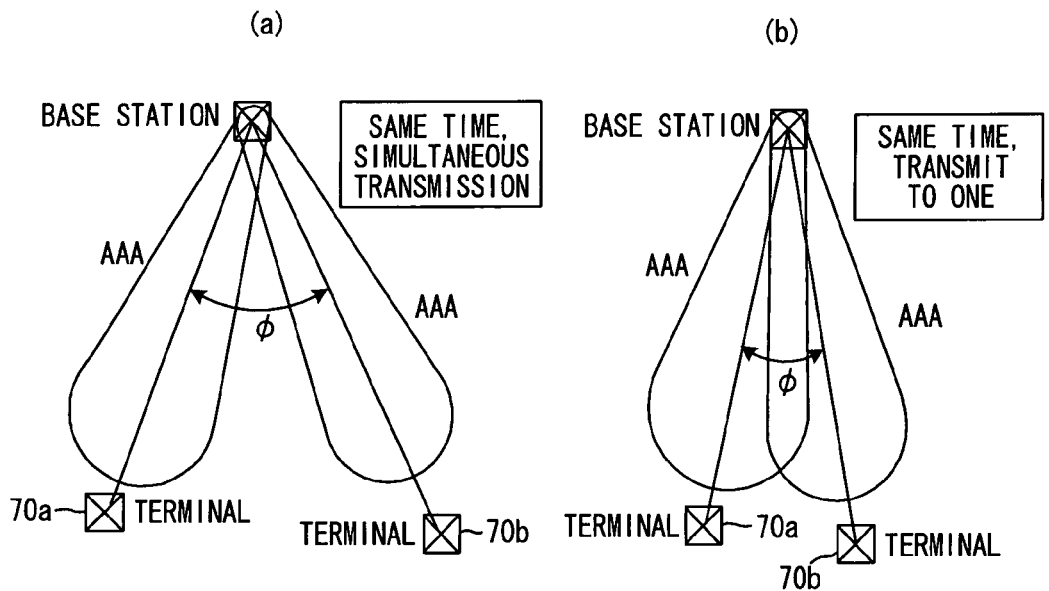
FIG. 12 explains a case in which user data 1 and 2 are simultaneously multiplexed and transmitted.

When, as shown in (A) of FIG. 12, the angle φ between two mobile terminals 70a and 70b is large, even when frame data at the same frequency is transmitted to each of the terminals 70a and 70b simultaneously, the transmission data can be received correctly by each of the mobile terminals without interference. However, when as shown in (B) of FIG. 12 the angle φ between two mobile terminals 70a and 70b is small, if transmission is performed simultaneously interference occurs, and the mobile terminals are no longer both able to receive the transmission data correctly. Hence in a third embodiment, the angular difference φ between the terminal directions is calculated from position information for the two mobile terminals 70a and 70b, and if the angular difference φ is larger than a preset angle then AAA transmission to each of the terminals is performed simultaneously to increase the transmission rate, but if smaller than the preset angle then control is executed so as to perform AAA transmission with separate timing.

Figure 13:
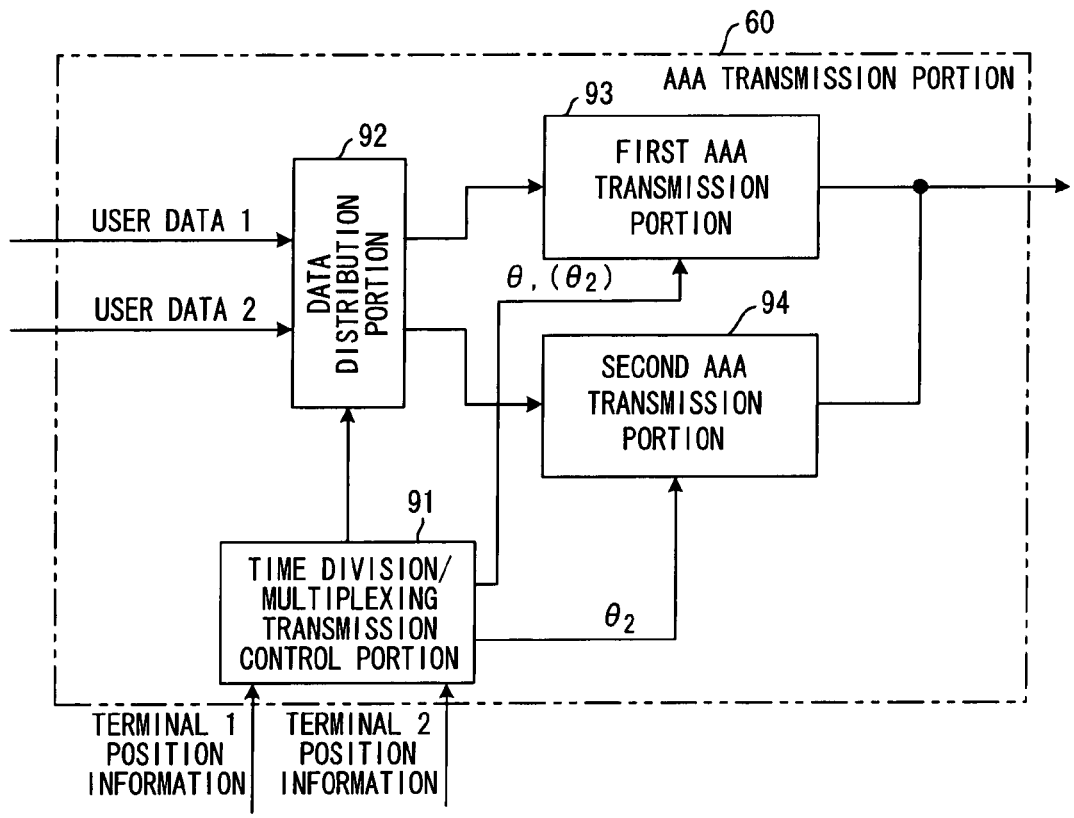
FIG. 13 shows the configuration of the AAA transmission portion of a third embodiment.

FIG. 13 shows the configuration of the AAA transmission portion 60 of the third embodiment. The time division/multiplexing transmission control portion 91 calculates the terminal directions $\theta_1$, $\theta_2$ from position information for the mobile terminals 70a and 70b, calculates the angular difference φ between these directions, and judges whether φ is equal to or greater than a preset angle $\phi_s$. If the angular difference φ is equal to or less than the preset angle $\phi_s$ ((B) of FIG. 12), then the data distribution portion 92 performs time-division input of data destined for the mobile terminals 70a and 70b (user data 1 and user data 2) to the first AAA transmission portion 93, and the first AAA transmission portion 93 performs beam forming based on the directions $\theta_1$ and $\theta_2$, and performs time-division transmission of user data 1 and user data 2 toward the mobile terminals 70a and 70b respectively.

On the other hand, if the angular difference φ is equal to or greater than the preset angle $\phi_s$ ((A) of FIG. 12), then the data distribution portion 92 simultaneously inputs the data destined for the mobile terminals 70a and 70b (user data 1 and user data 2) to the first AAA transmission portion 93 and second AAA transmission portion 94, and the first AAA transmission portion 93 performs beam forming based on the direction $\theta_1$ and transmits user data 1 toward mobile terminal 70a, while the second AAA transmission portion 94 performs beam forming based on the direction $\theta_2$, and transmits user data 2 toward mobile terminal 70b. By this means, simultaneous multiplexed data transmission to the mobile terminals 70a and 70b is performed.

(D) Fourth Embodiment

In the above embodiments, cases were explained in which AAA transmission was performed as transmission control to transmit a single stream; but instead of AAA transmission, antenna diversity transmission is also possible. As antenna diversity transmission control, for example, multi-antenna transmission control employing Space-Time Transmit Diversity (STTD) is possible (see Japanese Patent Laid-open No. 2003-258763, FIG. 20 and FIG. 21).

Figure 14:
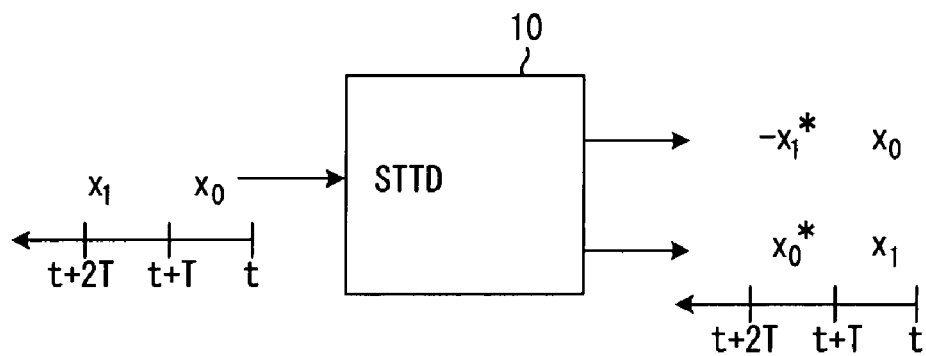
FIG. 14 is a drawing explaining STTD.
Figure 15:
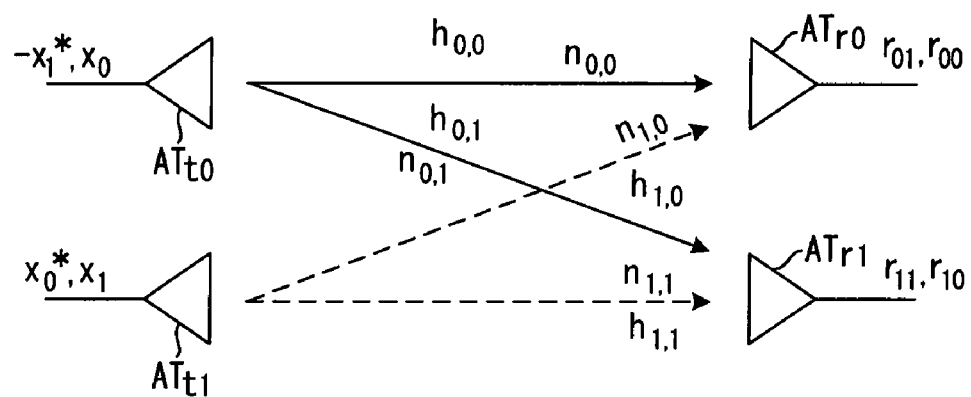
FIG. 15 is another drawing explaining STTD.

FIG. 14 explains STTD when the number of transmission antennas and the number of reception antennas are both two. On the transmitting side, the STTD encoder 10 converts continuous two-symbol data $[x_0, x_1]$ with period T into two series of symbol data strings. The first data string is $[x_0, -x_1^*]$, and the second data string is $[x_1, x_0^*]$. As shown in FIG. 15, these two series of data are transmitted by two transmission antennas $ATt_0, ATt_1$ toward reception antennas $ATr_0, ATr_1$. If the channel response characteristics between the two transmission antennas $ATt_0$ and $ATt_1$ and the two reception antennas $Atr_0$ and $Atr_1$ are $h_{0,0}, h_{0,1}, h_{1,0}, h_{1,1}$, the noise is $n_{0,0}, n_{0,1}, n_{1,0}, n_{1,1}$, and the signal received by antenna j at time t is $r_{j,t}$, then the received signals $r_{0,0}, r_{0,1}; r_{1,0}, r_{1,1}$ of the reception antennas $ATr_0, ATr_1$ can be represented by the following equations:

$$r_{0,0} = h_{0,0}X_0 + h_{1,0}X_1 + n_{0,0} \quad (3a)$$

$$r_{0,1} = h_{0,0}X_1^* + h_{1,0}X_0^* + n_{0,1} \quad (3b)$$

$$r_{1,0} = h_{0,1}X_0 + h_{1,1}X_1 + n_{1,0} \quad (3c)$$

$$r_{1,1} = h_{0,1}X_1^* + h_{1,1}X_0^* + n_{1,1} \quad (3d)$$

Figure 16:
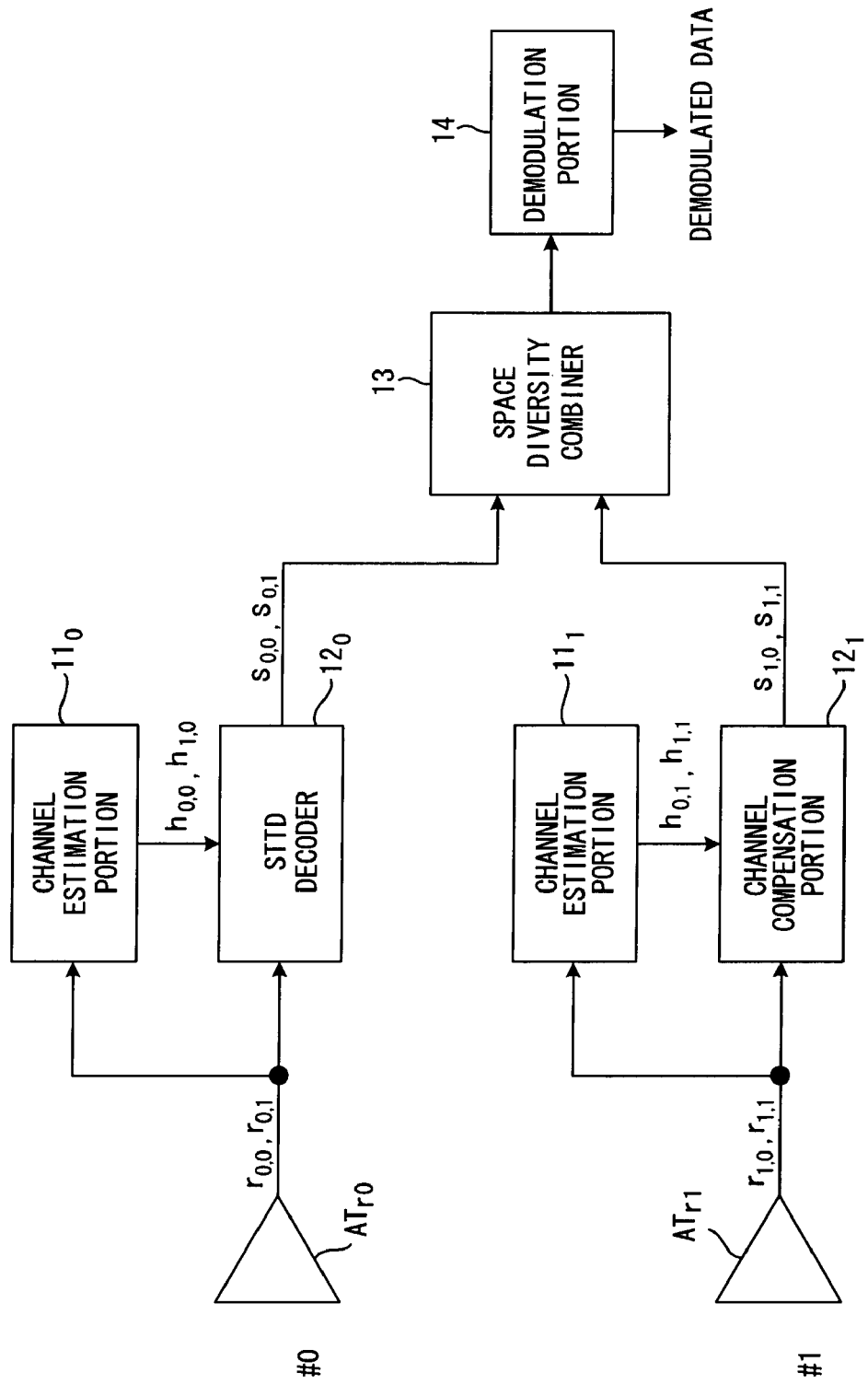
FIG. 16 shows the receiving-side configuration of an "STTD+space diversity" configuration.

FIG. 16 shows the configuration of the receiving side in an "STTD+space diversity configuration". The channel estimation portions $11_0, 11_1$ in branches #0 and #1 estimate the channel response characteristics $h_{0,0}, h_{1,0}; h_{0,1}, h_{1,1}$ in branches #0, #1, and input these to the STTD decoders $12_0, 12_1$. The STTD decoders $12_0, 12_1$, output signals $s_{0,0}, s_{0,1}; s_{1,0}, s_{1,1}$ as indicated by the following respective equations.

$$s_{0,0} = h_{0,0}^* r_{0,0} + h_{1,0} r_{0,1}^* \quad (3e)$$

$$s_{0,1} = h_{1,0}^* r_{0,0} + h_{0,0} r_{0,1}^* \quad (3f)$$

$$s_{1,0} = h_{0,1}^* r_{1,0} + h_{1,1} r_{1,1}^* \quad (3g)$$

$$s_{1,1} = h_{1,1}^* r_{1,0} + h_{0,1} r_{1,1}^* \quad (3h)$$

Substituting (3a) through (3d) into the above equations yields the following:

$$s_{0,0} = (|h_{0,0}|^2 + |h_{1,0}|^2)X_0 + h_{0,0}^* n_{0,0} + h_{1,0} n_{0,1}^* \quad (3i)$$

$$s_{0,1} = (|h_{0,0}|^2 + |h_{1,0}|^2)X_1 + h_{1,0}^* n_{0,0} + h_{0,0} n_{0,1}^* \quad (3j)$$

$$s_{1,0} = (|h_{0,1}|^2 + |h_{1,1}|^2)X_0 + h_{0,1}^* n_{1,0} + h_{1,1} n_{1,1}^* \quad (3k)$$

$$s_{1,1} = (|h_{0,1}|^2 + |h_{1,1}|^2)X_1 + h_{1,1}^* n_{1,0} + h_{0,1} n_{1,1}^* \quad (3m)$$

The values in parentheses in the first term on the right-hand side of (3i) to (3m) above are the STTD gain.

The space diversity synthesis portion 13 combines the outputs of each of the branches of the STTD decoders $12_0, 12_1$, and inputs the combined signals $$\tilde{s}_0 = (|h_{0,0}|^2 + |h_{1,0}|^2 + |h_{0,1}|^2 + |h_{1,1}|^2)x_0 + h_{0,0}^* n_{0,0} + h_{1,0} n_{0,1}^* + h_{0,1}^* n_{1,0} + h_{1,1} n_{1,1}^* \quad (3n)$$

$$\tilde{s}_1 = (|h_{0,0}|^2 + |h_{1,0}|^2 + |h_{0,1}|^2 + |h_{1,1}|^2)x_1 + h_{1,0}^* n_{0,0} + h_{0,0} n_{0,1}^* + h_{1,1}^* n_{1,0} + h_{0,1} n_{1,1}^* \quad (3p)$$

into the demodulation portion 14. The values in parentheses on the right-hand side are the totals of the STTD gain and the diversity gain. The above is STTD for a case in which there are two transmission antennas and two reception antennas, but the numbers of antennas can be increased.

Figure 17:
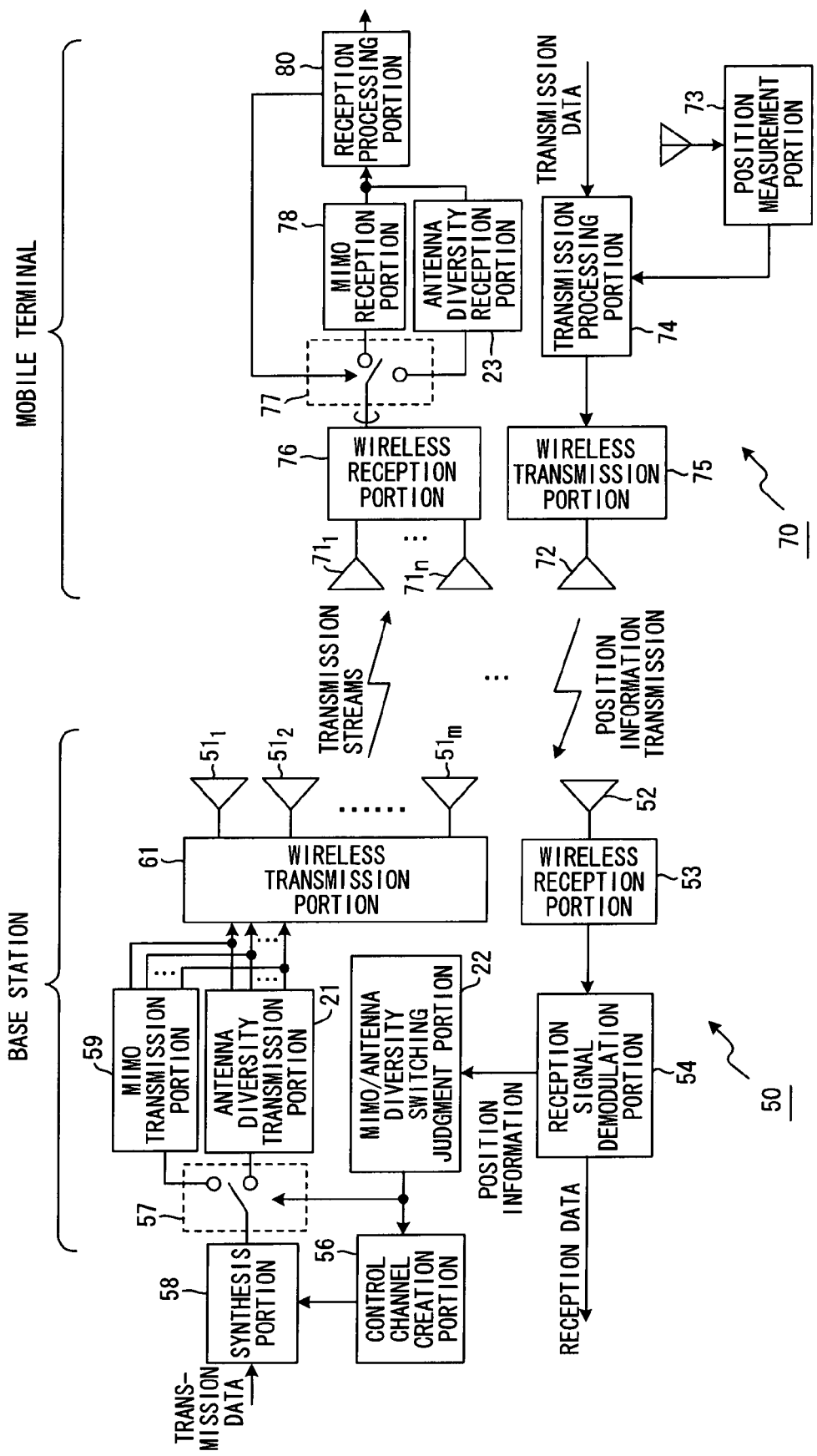
FIG. 17 shows the configuration of the communication system of a fourth embodiment.
Figure 18:
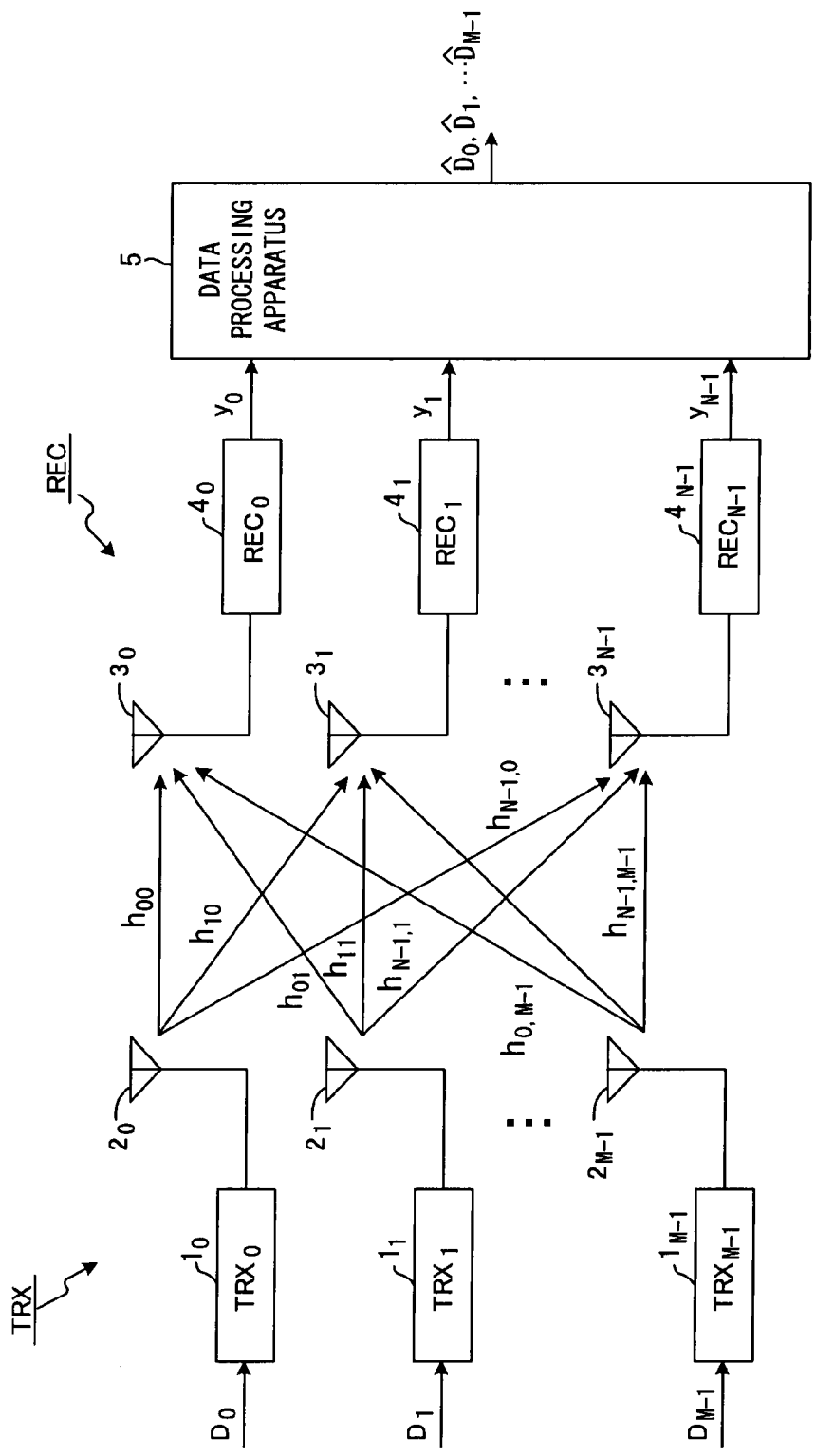
FIG. 18 shows the configuration of a MIMO multiplexing transmission system; and,
FIG. 19 shows the configuration of a wireless apparatus which transmits and receives data through AAA control.
Figure 19:
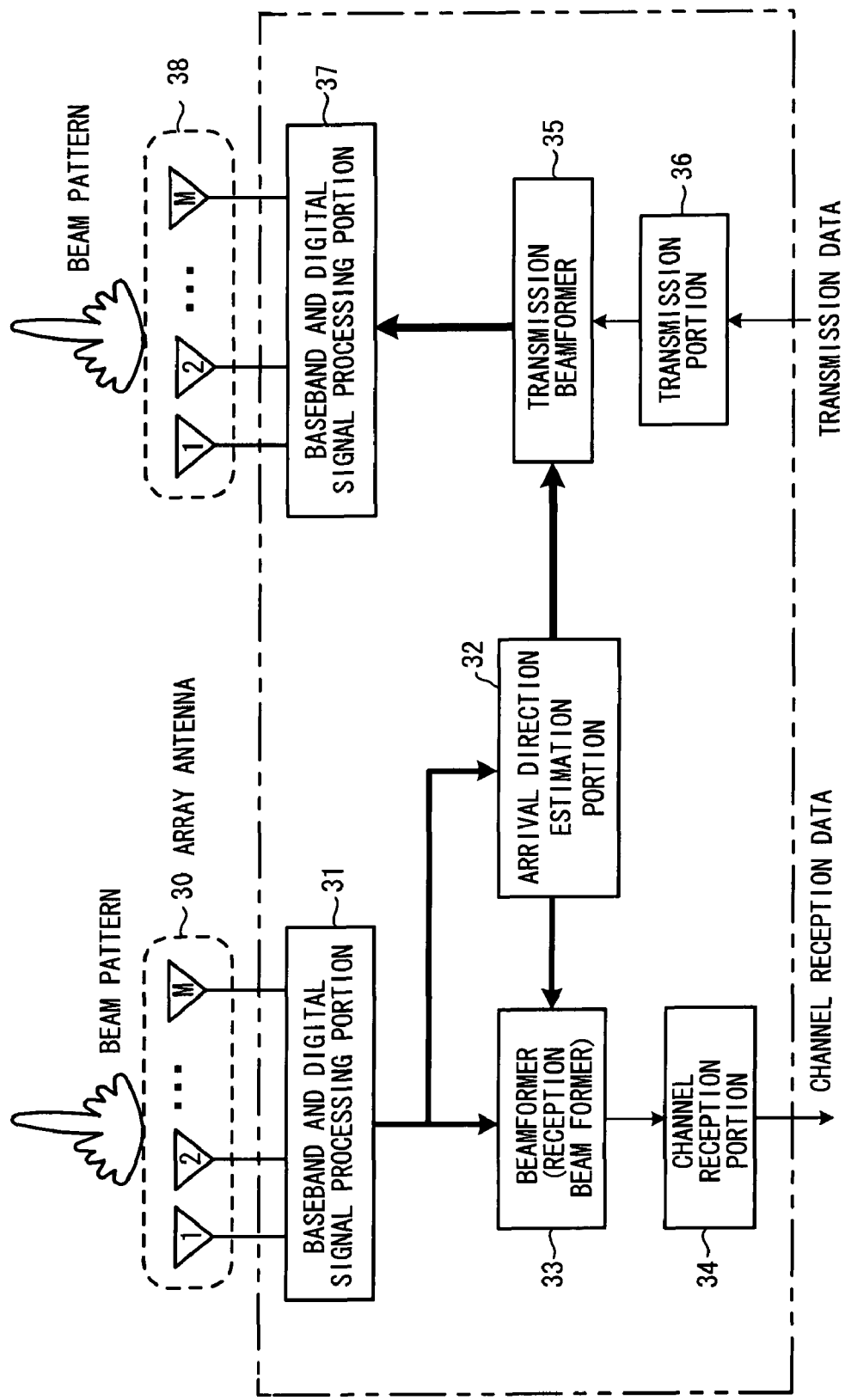

FIG. 17 shows the communication system configuration of the fourth embodiment; portions which are the same as in the first embodiment in FIG. 2 are assigned the same symbols. Differences include the provision of an antenna diversity transmission portion 21 in place of an AAA transmission portion in the base station 50, the provision of a MIMO/antenna diversity switching judgment portion 22 in place of the MIMO/AAA switching judgment portion 55, and the provision of an antenna diversity reception portion 23 in place of the AAA reception portion in the mobile terminal 70. The transmission method switching control in the base station (MIMO/antenna diversity transmission switching control) and the reception method switching control in the mobile terminal (MIMO/antenna diversity reception switching control) in the fourth embodiment can be controlled exactly the same as in the first embodiment. Moreover, the second embodiment and third embodiment can be similarly applied to cases in which antenna diversity transmission is performed.

In the above, this invention was explained for cases in which multi-antenna transmission is performed in communication in the downlink direction; however, this invention can also be applied to multi-antenna transmission for communication in the uplink direction. That is, multi-antenna transmission is not limited to the base station apparatus.

By means of this invention, MIMO can be used in high-speed data transmission in the vicinity of a base station. Moreover, through formation of an AAA directional beam, communication is also possible even at cell edges distant from the base station. That is, by means of this invention, MIMO and AAA or antenna diversity are switched and used, so that maximal service can be provided at various distances, extending from the vicinity of the base station to cell edges.

What is claimed is:

1. A wireless communication apparatus which has a plurality of antennas, and which switches between first multi-antenna transmission control that performs multi-stream transmission and second multi-antenna transmission control that performs single-stream transmission, comprising:
   a first transmission portion configured to perform multiple-input multiple-output (MIMO) transmission control as the first multi-antenna transmission control;
   a second transmission portion configured to perform second multi-antenna transmission control;
   a control portion configured to control such that, when a distance to a communication partner apparatus is smaller than a preset distance, MIMO transmission is performed as the first multi-antenna transmission control, and when the distance is greater than the preset distance, the second multi-antenna transmission is performed; and
   a storage portion configured to store building data that specify positions of buildings and three-dimensional shapes of the buildings, wherein the control portion makes reference to the building data and judges whether a building, which blocks communication with the communication partner apparatus, exists on a straight line connecting the wireless communication apparatus and the communication partner apparatus, and if the building exists, executes control such that MIMO transmission is performed even when the distance to the communication partner apparatus is greater than the preset distance.

2. A wireless communication method in a communication system which performs communication by switching between first multi-antenna transmission control that performs multi-stream transmission and second multi-antenna transmission control that performs single-stream transmission, comprising:

calculating a distance between a base station and a mobile terminal;

performing by a transmitter, when the distance is smaller than a preset distance, multiple-input multiple-output (MIMO) transmission control as the first multi-antenna transmission control, and when the distance is greater than the preset distance, performing the second multi-antenna transmission control;

storing building data that specify positions and three-dimensional shapes of buildings in a memory; and making reference to the building data to judge whether a building, which blocks communication with a mobile terminal, exists on a straight line connecting the base station and the mobile terminal, and controlling to perform, if the building exists, MIMO transmission even if the distance to the terminal is greater than the preset distance.

* * * * *